United States Patent [19]
Blakeslee et al.

[11] Patent Number: 5,206,774
[45] Date of Patent: Apr. 27, 1993

[54] PROCESS FOR MAKING A MAGNETO-RESISTIVE MAGNETIC TRANSDUCER HAVING INCREASED SENSITIVITY AND AN IMPROVED FLUX PATH AND THE PRODUCT MADE THEREBY

[75] Inventors: Marybelle C. Blakeslee, Golden; Richard H. Dee, Louisville, both of Colo.; Richard F. M. Thornley, Fort Lauderdale, Fla.

[73] Assignee: Storage Technology Corporation, Louisville, Colo.

[21] Appl. No.: 736,243

[22] Filed: Jul. 26, 1991

[51] Int. Cl.[5] .................................... G11B 5/127
[52] U.S. Cl. .................................... 360/113; 360/110
[58] Field of Search ............... 360/113; 324/252; 338/32 R

[56] References Cited

U.S. PATENT DOCUMENTS

| | | | |
|---|---|---|---|
| 3,840,898 | 10/1974 | Bajorek et al. | 360/113 |
| 3,908,194 | 9/1975 | Romankiw | 360/113 |
| 3,940,797 | 2/1976 | Brock et al. | 360/113 |
| 3,967,368 | 7/1976 | Brock et al. | 29/603 |
| 4,044,392 | 8/1977 | Brock et al. | 360/113 |
| 4,051,542 | 9/1977 | Kanai | 360/113 |
| 4,071,868 | 1/1978 | Kaminaka et al. | 360/113 |
| 4,150,408 | 4/1979 | Koel et al. | 360/113 |
| 4,179,720 | 12/1979 | Miura | 360/113 |
| 4,354,212 | 10/1982 | Nouchi et al. | 360/113 |
| 4,425,593 | 1/1984 | Postma | 360/113 |
| 4,523,243 | 6/1985 | Billington | 360/113 |
| 4,547,828 | 10/1985 | Bloomer | 361/86 |
| 4,599,668 | 7/1986 | Griffith | 360/113 |
| 4,617,600 | 10/1986 | Somers | 360/113 |
| 4,644,430 | 2/1987 | French | 360/113 |
| 4,685,005 | 8/1987 | Fields, Jr. | 360/53 |
| 4,797,766 | 1/1989 | Enz | 360/113 |
| 4,803,580 | 2/1989 | Mowry | 360/113 |
| 4,803,581 | 2/1989 | Kira et al. | 360/113 |
| 4,833,560 | 5/1989 | Doyle | 360/113 |
| 4,853,633 | 8/1989 | Matsumoto | 324/210 |
| 4,907,113 | 3/1990 | Mallary | 360/112 |
| 4,907,115 | 3/1990 | Ruigrok et al. | 360/113 |
| 4,939,837 | 7/1990 | Krounbi | 29/603 |
| 4,954,920 | 9/1990 | Yamada et al. | 360/113 |
| 4,967,298 | 10/1990 | Mowry | 360/113 |

Primary Examiner—Craig E. Church
Attorney, Agent, or Firm—Duft, Graziano & Forest

[57] ABSTRACT

An MR read head in which increased sensitivity is achieved by a flux path that enables an increased amount of flux that enters the MR element at its top edge on a read operation to pass through the entirety of the MR read element. This improved path is achieved by forming an extension area on the bottom inner edge of the MR read element. The extension extends through an aperture in an insulator layer to a first magnetic pole piece. This extension provides a low-impedance path that permits a higher percentage of the flux entering the MR element at its top portion to travel through the entirety of the MR element and thereby generates an increased signal output per unit of detected flux.

13 Claims, 2 Drawing Sheets

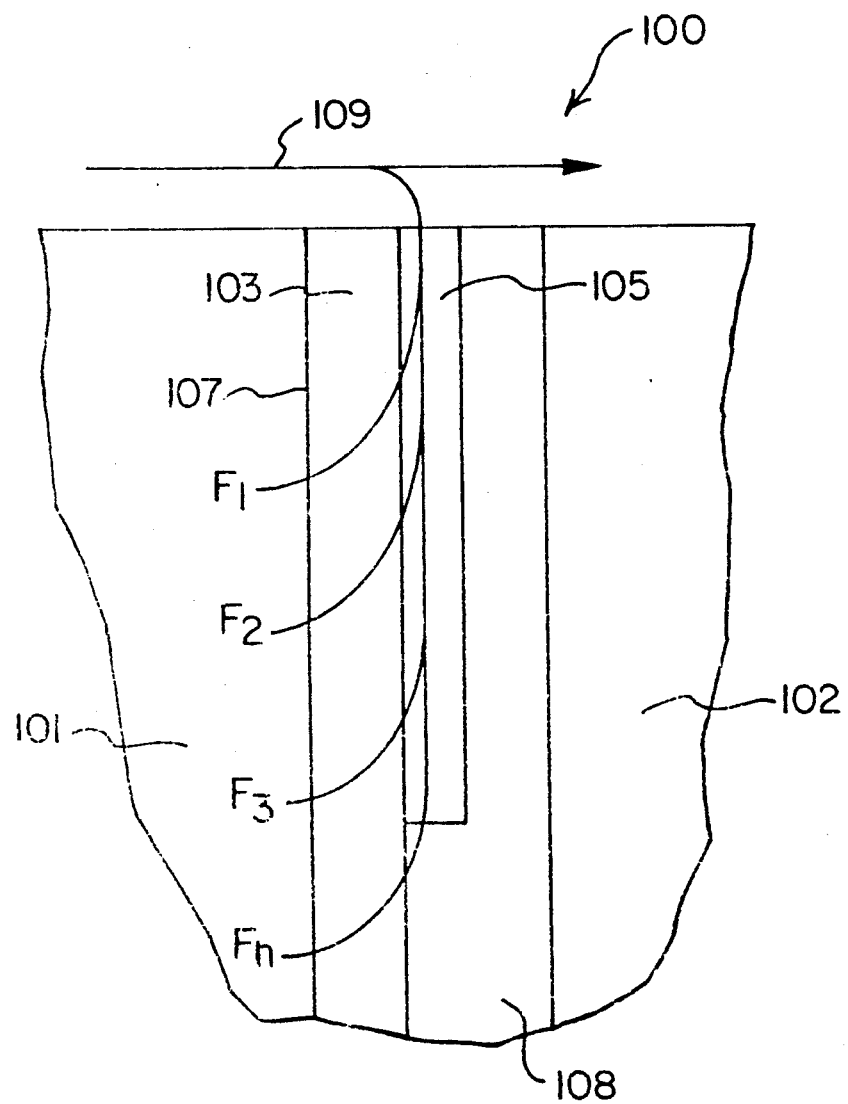
FIG. 1. - PRIOR ART

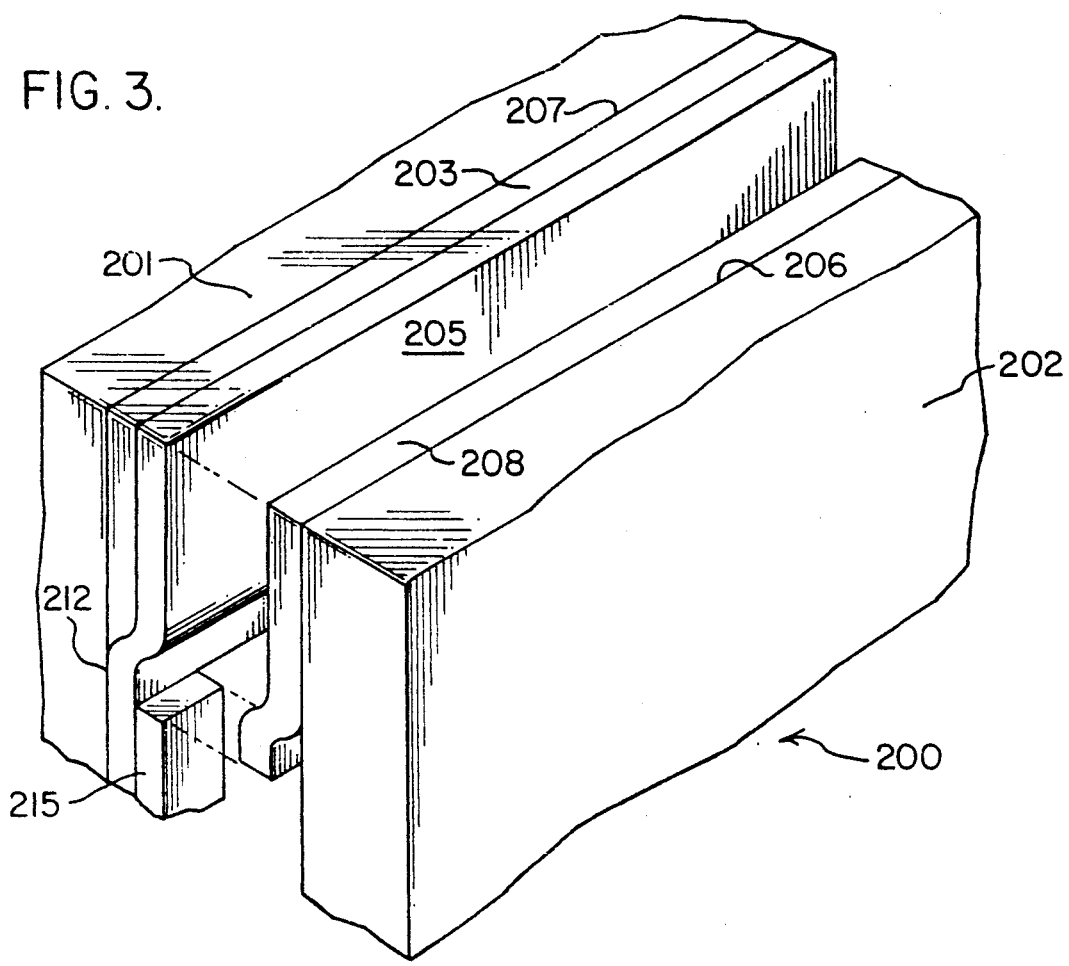
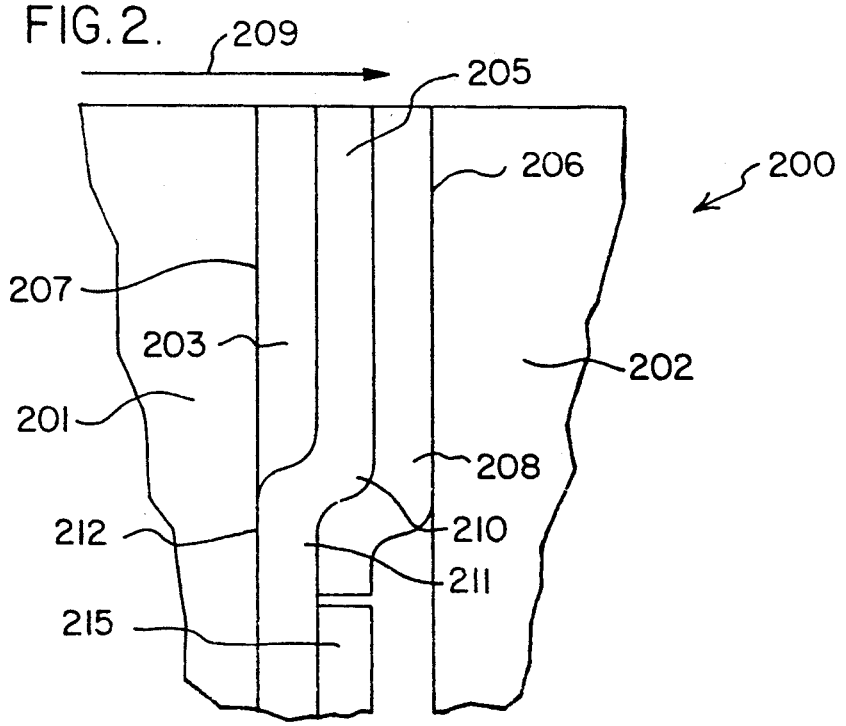

PROCESS FOR MAKING A MAGNETO-RESISTIVE MAGNETIC TRANSDUCER HAVING INCREASED SENSITIVITY AND AN IMPROVED FLUX PATH AND THE PRODUCT MADE THEREBY

FIELD OF THE INVENTION

This invention relates to apparatus comprising, as well as a method of making, an MR (magneto-resistive) read head having an increased output signal sensitivity. This invention further relates to a read head where the MR element has an improved flux path that minimizes flux leakage and thereby increases the signal sensitivity of the read head.

BACKGROUND OF THE INVENTION

MR heads have the potential of being built to accommodate very narrow track widths both for tape and disk applications. A key requirement for any read head is that the amplitude of the read signals be reasonably large relative to the background electronic noise. Progress toward narrow tracks inevitably reduces the read signal amplitude because of the reduced amount of flux that enters the head. Ultimately this trend sets the limits to achievable track densities. The present invention increases the read signal amplitudes and thereby facilitates the reading of tapes or disks and the like (hereinafter tapes) with narrower tracks.

It is known to position an MR element between two magnetic pole pieces which function as a read head when magnetic material, such as a tape, is passed over the gap defined by the spacing between the pole pieces. In order to provide MR heads having a high signal sensitivity, and hence the capability of reading high density data, it is important that an optimum flux path be provided within the MR element. This generates the greatest possible output signal from the MR element as it responds to flux changes.

In prior art heads, the MR element is positioned in parallel between two parallel mating faces of the magnetic pole pieces. When a magnetic tape passes over the head gap on a read operation, it is the flux that emanates from the tape and enters the MR element that causes the MR element to change its resistance and generate an output signal representing the detected flux. If this output signal is to be of the largest possible amplitude for a given flux level (high signal sensitivity), it is necessary that this flux travel a maximum distance within the MR element. Flux enters the top of the MR element and travels downwards within the MR element and then returns via a magnetic pole piece to the tape.

FIG. 1 shows a prior art head 100 of this type as comprising a first magnetic pole piece 101 having a mating surface 107, an insulator 103 affixed to mating surface 107, an MR element 105 affixed to insulator 103, an insulator 108 and a second magnetic pole piece 102 having a mating surface 106.

Head 100 operates in such a manner that as tape 109 passes over the pole piece gap, flux emanates therefrom and enters the top of MR element 105. Only that portion of the flux that enters the MR element is effective in generating an output signal. The total flux F that emanates from the tape comprises the various sub-elements F1, F2, F3 . . . Fn. Flux element F1 enters the MR element and travels downward only a short distance before it leaks through insulator 103, enters pole piece 101 and returns to tape 109. Flux element F1 generates some, but not much, of the output signal of MR element 105. Flux element F2 travels downward somewhat further within MR element 105 before it jumps through insulator 103 and returns via pole piece 101 to tape 109. Flux element F2 generates a somewhat greater output signal in MR element than does flux element F1. Flux element F3 travels downward further within MR element 105 before it returns via insulator 103 and pole piece 101 to tape 109. It is more effective in generating an output signal per unit of flux than are flux elements F1 and F2. The flux element Fn travels downward through the entirety of MR element 105 before it returns to pole piece 101 and tape 109. This maximum length of flux travel for flux element Fn within MR element 105 causes it to be the most effective in generating an output signal in MR element 105.

The efficiency of the various portions of MR element 105 decreases with downward flux travel through MR element 105. The MR element is the most effective at its top portion in FIG. 1 since all of the flux that enters the element travels therethrough and is effective to generate an output signal. However, the efficiency rapidly decreases with downward travel toward its inner edge since most of the flux leaks through insulator 103 and returns to tape 109 rather than traveling downward the entire length of MR element 105. The average flux density is thus less than 50% of the entering flux density and the effectiveness of the output signal is similarly decreased. The MR heads of the prior art thus have an inherent limitation that their flux efficiency is less than 50% as compared to the flux density at the outer or top portion of the MR element. This 50% limitation causes a corresponding decrease in the output signal generated by the heads and thereby makes more difficult the reading of data on narrow tracks.

It is therefore a problem for the prior art MR heads to read data and signals on tracks of narrow width. This limits the progress of the industry toward increasingly narrow tracks and higher density data on tapes and disks.

SUMMARY OF THE INVENTION

The present invention overcomes the above-discussed problems and achieves a technical advance by providing an MR read head having an improved flux path for its MR element. This improved flux path permits an increased amount of the flux that enters the MR element to travel therethrough a greater distance from top to bottom. This increases its signal sensitivity by increasing its average flux density by a factor of up to twice that found in prior art arrangements.

The MR element of the head of the present invention is spaced apart by an insulator from a mating surface of a first pole piece. However, near the inner or bottom portion of the MR element, an extension is formed that connects the bottom inner portion of the MR element to the first pole piece. This extension provides a low impedance flux path and allows the flux that enters the MR element to travel an increased distance within the MR element before returning via the extension and first pole piece to the tape. This allows the flux density at the inner edge to remain high throughout all areas of the MR element and increases the average flux density in the element by up to a factor of two over that capable of the prior art arrangements.

The tape flux enters the MR element at its top. The lowest impedance path for the flux is to travel downward through the entirety of the MR element and via the extension to the area where the extension contacts the first magnetic pole piece. From there, the flux enters the pole piece and returns to the tape. This path permits a higher percentage of the flux to travel a greater distance through the MR element. This increases the flux sensitivity of the MR element and permits a head embodying this MR element to read tapes having narrower track widths than is possible with prior art MR elements.

It is therefore seen that the present invention overcomes the above-discussed problems of the prior art and thereby achieves a technical advance.

BRIEF DESCRIPTION OF THE DRAWINGS

The invention may be better understood from a reading of the following description of one possible exemplary embodiment thereof taken in conjunction with the drawing in which:

FIG. 1 shows a prior art head;

FIG. 2 discloses a head embodying the present invention; and

FIG. 3 discloses further details of the head of FIG. 2.

DETAILED DESCRIPTION OF THE DRAWING

FIG. 1 discloses a prior art read head 100 comprising a first pole piece 101, a second pole piece 102 and an MR element 105 positioned therebetween and essentially parallel to mating surfaces 106 and 107 of pole pieces 102 and 101. All of the flux enters the top of MR element 105 on a read operation. However, the efficiency of the MR element rapidly decreases since as the flux travels from the top to the bottom, more and more of the flux leaves the MR element, crosses insulator 103 and returns via pole piece 101 to tape 109. Each element of flux such as F1, F2 and F3 that leaves MR element 105, rather than traveling from the top to the bottom of the MR element, degrades its signal output and thereby tends to limit the widths of the tape tracks that can be read by head 100.

FIG. 2 shows a head 200 having an MR element constructed in accordance with the present invention. Head 200 comprises a first pole piece 201, a second pole piece 202, and an MR element 205 positioned between the two pole pieces. The MR element is positioned with its planar surfaces essentially parallel to mating surface 207 of pole piece 201 and surface 206 of pole piece 202. MR element 205 is deposited on the surface of insulator 203 throughout much of its area in the same manner as is the MR element 105 on FIG. 1. However, attached to the bottom or inner portion 208 of MR element 205, is an extension 210 and 211 that extends through an opening in insulator 203 and contacts pole piece 201 in area 212. This extension provides a low-impedance path that allows the majority of the tape flux that enters the MR element at its top to travel down through the entire length of MR element 205, pass via extension portion 210, 211 and 212 before it returns via pole piece 201 to tape 209. This provides a low impedance flux path within element 205. As a result, a lesser percentage of the flux that enters the MR element at the top is lost by leaking prematurely through insulator 203 back to pole piece 201. This travel of more of the flux through the entire length of the MR element increases the sensitivity of MR element 205 so that it can produce a greater output signal for a given flux input. This permits the head of FIG. 2 to read tracks of narrower widths than is possible with the prior art head shown in FIG. 1.

The second pole piece 202 is shown spaced apart on FIG. 3 from the remainder of the MR head in order to facilitate an understanding of FIG. 2. An insulator 208 may either be affixed to second pole piece 202 or, if desired, may be affixed to MR element 205 following its deposition on insulator 203 and pole piece 201. In its final assembly, the pole piece and insulator 208 are affixed to the MR element by any suitable means such as, for example, adhesive.

TABLE 1

1. Deposit insulator on a mating surface of a first pole piece.
2. Cover insulator with photoresist, mask and expose to define an aperture area on the insulator.
3. Develop and etch insulator to form aperture extending through insulator to mating surface of first pole piece.
4. Deposit MR material on insulator and aperture.
5. Cover MR material with photoresist mask and expose to define area of MR element structure.
6. Etch away MR material to expose insulator in areas that do not comprise the MR element structure.
7. Deposit second insulator layer.
8. Apply photoresist, mask and expose to define areas where leads are to be attached to MR element.
9. Develop photoresist and etch areas where leads are to be attached.
10. Deposit leads on MR element.
11. Attach second pole piece to second insulator.

Table 1 describes the process used to form the read element of the present invention.

Step 1 deposits an insulator layer 203 on mating surface 207 of first pole piece 201. Step 2 covers insulator 203 with photoresist, masks and exposes to define an aperture area on an inner lower portion of the insulator 203 layer. Step 3 develops the photoresist and etches to form an aperture 212 in insulator layer 203 to expose the area 212 of the first magnetic pole piece. Step 4 forms MR element 205 by depositing MR material to cover the insulator 203 layer as well as the aperture 212 extending through insulator 203 to the exposed pole piece 201. Step 5 covers the MR layer with photoresist, masks and exposes to define an area that is to comprise the MR element 205. Step 6 etches away the MR material to expose the insulator in those portions of the insulator that do not comprise the MR element 205. Step 7 deposits an insulator layer 208 on the MR element. Step 8 applies photoresist, masks and exposes to define areas where leads 215 are to be attached to the MR element. Step 9 develops the photoresist and etches the areas where leads 215 are to be attached to the MR element. Step 10 deposits leads 215 on the MR element in the exposed areas. Step 11 attaches a second magnetic pole piece 202 to the insulator formed on the MR element.

FIG. 3 is a perspective view of the head of FIG. 2. One of the conductors 215 that is attached to MR element 205 is shown in FIG. 3.

The insulators 103 and 108 for FIG. 1 and insulators and insulator layers 203 and 208 of the present invention are of the non-magnetic type.

It can be seen that the present invention comprises a new and improved process of making a new and improved MR head that has an improved flux path and resultant improved signal sensitivity in response to flux changes. This permits the head to read narrow width tracks on magnetic material such as magnetic tapes or disks or the like.

While a specific embodiment of the present invention has been disclosed, it is expected that others skilled in the art can and will devise alternate embodiments that fall within the scope of the following claims.

We claim:

1. An MR read head comprising:

a first pole piece having a first mating surface, a second pole piece having a second mating surface positioned facing said first mating surface, an MR read element positioned intermediate said first and second mating surfaces and having planar surfaces, a first planar surface of said MR element being positioned adjacent said first mating surface and a second planar surface of said MR element being positioned adjacent said second mating surface so as to form an operative read head wherein said MR element cooperates with said pole pieces to generate an output signal representing a detected flux in response to the movement of a magnetic material over top edges of said pole pieces and said MR element, said top edge of said MR element being adapted to receive flux from said magnetic material positioned over a top portion of said head, and an extension connecting a lower edge of said MR element with said first mating surface to provide a low impedance flux path for flux entering said top edge of said MR element.

2. The head of claim 1 wherein said head further comprises:

a first insulator layer affixed to said first mating surface, said first planar surface of said MR element being affixed to said first insulator layer, an aperture in said first insulator layer adjacent said lower edge of said MR element, and said extension extending from said lower edge of said MR element through said first insulator to said first mating surface of said first pole piece.

3. The head of claim 2 wherein said head further comprises:

a second insulator layer affixed to said second planar surface of said MR element, said second mating surface of said second pole piece being affixed to said second insulator layer, and said extension providing a low impedance flux path for flux entering said top edge of said MR element whereby a greater amount of flux entering said top edge travels downward through the entirety of said MR element and through said extension to said first pole piece to generate an increased output signal in said MR element representing detected flux changes.

4. An MR read head having a low impedance flux path and increased signal sensitivity, said head comprising:

a first pole piece having a first mating surface on an inner side of said first pole piece, a second pole piece having a second mating surface positioned substantially parallel to and facing said first mating surface on an inner side of said second pole piece, an MR read element having first and second planar surfaces positioned substantially parallel to and intermediate said first and second mating surfaces, said first planar surface of said MR element being positioned adjacent said first mating surface of said first pole piece and said second planar surface of said MR element being positioned adjacent said second mating surface of said second pole piece, said first pole piece and said second pole piece and said MR element forming an operative read head wherein said MR element cooperates with said pole pieces to generate an output signal representing a detected flux in response to the movement of magnetic material over top edges of said pole pieces and said MR element in a direction perpendicular to the planes containing said mating surfaces and said planar surfaces, said top edge of said MR element being adapted to receive flux from said magnetic material in response to said movement, and an extension connecting a lower edge of said MR element with said first mating surface to provide a low impedance flux path for flux entering said top edge of said MR element.

5. The head of claim 4 wherein said head further comprises:

a first insulator layer affixed to said first mating surface, said first planar surface of said MR element being affixed to said first insulator layer, an aperture in said first insulator layer adjacent said lower edge of said MR element, and said extension extending from said lower edge of said MR element through said first insulator to said first mating surface of said first pole piece.

6. The head of claim 5 wherein said head further comprises:

a second insulator layer having a first side affixed to said second planar surface of said MR element, said second mating surface of said second pole piece being affixed to a second side of said second insulator layer, and said extension of said MR element providing a low impedance flux path for flux entering said top edge of said MR element whereby a greater amount of the flux that enters said top edge travel downward through the entirety of said MR element and through said extension to said first pole piece to generate an increased output signal in said MR element.

7. A method of forming an MR read head, said method comprising the steps of:

positioning an MR element intermediate a first pole piece having a first mating surface and a second pole piece having a second mating surface positioned facing said first mating surface, said MR read element having first and second planar surfaces, positioning said first planar surface of said MR element adjacent said first mating surface and positioning said second planar surface of said MR element adjacent a second mating surface so as to form an operative read head wherein said MR element cooperates with said pole pieces to generate an output signal representing a detected flux in response to the movement of a magnetic material over top edges of said pole pieces and said MR element, said top edge of said MR element being adapted to receive flux from said magnetic material positioned over a top portion of said head, and forming an extension connecting a lower edge of said MR element with said first mating surface to provide a low impedance flux path for flux entering said top edge of said MR element.

8. The method of claim 7 wherein said method further comprises the steps of:

affixing a first insulator layer to said first mating surface, affixing said first planar surface of said MR element to said first insulator layer, forming an aperture in said first insulator layer adjacent said lower edge of said MR element, and said extension extending from said lower edge of said MR element through said first insulator to said first mating surface of said first pole piece.

9. The method of claim 8 wherein said method further comprises the steps of:

affixing a second insulator layer to said second planar surface of said MR element, affixing said second mating surface of said second pole piece to a second side of said second insulator layer, said extension providing a low impedance flux path for flux entering said top edge of said MR element whereby a greater amount of the flux that enters said top edge travel downward through the entirety of said MR element and through said extension to said first pole piece to generate an increased output signal in said MR element representing detected flux changes.

10. A method of forming an MR read head having a low impedance flux path and increased signal sensitivity, said method comprising the steps of:

positioning an MR element having first and second opposite facing planar surfaces between a first pole piece having a first mating surface on an inner side of said first pole piece and a second pole piece having a second mating surface positioned substantially parallel to and facing said first mating surface on an inner side of said second pole piece, a first one of said planar surfaces of said MR element being positioned adjacent said first mating surface and said second mating surface of said second pole piece being positioned adjacent a second one of said planar surfaces of said MR element, said first pole piece and said second pole piece and said MR element forming an operative read head wherein said MR element cooperates with said pole pieces to generate an output signal representing a detected flux change in response to the movement of a magnetic material over top edges of said pole pieces and said MR element in a direction perpendicular to the planes containing said mating surfaces and said planar surfaces, said top edge of said MR element being adapted to receive flux from said magnetic material in response to said movement, and forming an extension connecting a lower edge of said MR element with said first mating surface to provide a low impedance flux path for flux entering said top edge of said MR element.

11. The method of claim 10 wherein said method further comprises the steps of:

affixing a first insulator layer to said first mating surface, affixing said first planar surface of said MR element to said first insulator layer, forming an aperture in said first insulator layer adjacent said lower edge of said MR element, and forming said extension extending from said lower edge of said MR element through said first insulator to said first mating surface of said first pole piece.

12. The method of claim 11 wherein said method further comprises the steps of:

affixing a second insulator layer having a first side to said second planar surface of said MR element, affixing said second mating surface of said second pole piece to a second side of said second insulator layer, and said extension of said MR element providing a low impedance flux path for flux entering said top edge of said MR element whereby a greater amount of the flux that enters said top edge travel downward through the entirety of said MR element and through said extension to said first pole piece to generate an increased output signal in said MR element.

13. A method of forming an MR read head having a low impedance flux path and increased signal sensitivity, said method comprising the steps of:

forming a first insulator layer on a first mating surface of a first pole piece, forming an aperture in a lower area of said first insulator layer, forming an MR element on said first insulator layer with said formed MR element having a first planar surface in contact with said first insulator layer and an extension extending through said aperture to connect a lower edge of said MR element with said first mating surface, forming a second insulator layer on said MR element, affixing a second mating surface of a second pole piece to said second insulator layer, said first pole piece and said second pole piece and said MR element forming an operative read head wherein said MR element cooperates with said pole pieces to generate an output signal representing a detected flux changes in response to the movement of a magnetic material over top edges of said pole pieces and said MR element in a direction perpendicular to the planes containing said mating surfaces and said planar surfaces, said top edge of said MR element being adapted to receive flux from said magnetic material in response to said movement, and said extension of said MR element providing a low impedance flux path for flux entering said top edge of said MR element whereby a greater amount of the flux that enters said top edge travels downward through the entirety of said MR element and through said extension to said first pole piece to generate an increased output signal in said MR element.

* * * * *